(12) United States Patent
Tromm

(10) Patent No.: US 8,792,870 B2
(45) Date of Patent: Jul. 29, 2014

(54) SYSTEM AND METHOD FOR DELIVERY OF DATA BETWEEN A DATA PROVIDER AND A MOBILE TELEPHONE NETWORK SUBSCRIBER

(75) Inventor: Achim Tromm, Ratingen (DE)

(73) Assignee: Vodafone Holding GmbH, Dusseldorf (DE)

( * ) Notice: Subject to any disclaimer, the term of this patent is extended or adjusted under 35 U.S.C. 154(b) by 1712 days.

(21) Appl. No.: 11/821,566

(22) Filed: Jun. 21, 2007

(65) Prior Publication Data

US 2008/0160969 A1 Jul. 3, 2008

Related U.S. Application Data

(63) Continuation of application No. PCT/EP2005/056696, filed on Dec. 12, 2005.

(30) Foreign Application Priority Data

Dec. 28, 2004 (DE) .......................... 10 2004 063 688

(51) Int. Cl.
*H04L 29/08* (2006.01)
*H04M 3/00* (2006.01)
*G06F 15/16* (2006.01)
*G06F 9/45* (2006.01)
*H04L 29/06* (2006.01)
*H04W 8/24* (2009.01)

(52) U.S. Cl.
CPC ........... *H04W 8/245* (2013.01); *H04L 67/2823* (2013.01); *H04L 63/145* (2013.01); *H04L 63/02* (2013.01); *H04L 67/303* (2013.01)
USPC ........ 455/414.4; 455/420; 709/219; 717/136; 717/147

(58) Field of Classification Search
CPC ....... H04L 67/303; H04L 67/30; G06F 8/447; G06F 8/47; G06F 8/76; G06F 9/45504; H04W 4/08
USPC .................... 455/414.1–414.4, 419; 709/219; 717/136, 147
See application file for complete search history.

(56) References Cited

U.S. PATENT DOCUMENTS

| | | | | |
|---|---|---|---|---|
| 6,052,486 A * | 4/2000 | Knowlton et al. | ............ | 382/232 |
| 6,158,047 A * | 12/2000 | Le et al. | ......................... | 717/153 |
| 6,310,889 B1 * | 10/2001 | Parsons et al. | ................. | 370/466 |
| 6,987,963 B2 * | 1/2006 | Kouznetsov et al. | ....... | 455/414.1 |
| 7,035,653 B2 * | 4/2006 | Simon et al. | ................... | 455/466 |
| 7,113,776 B2 * | 9/2006 | Minear et al. | .................. | 455/419 |
| 7,804,435 B2 * | 9/2010 | Sadowski et al. | .............. | 341/155 |
| 2002/0091805 A1 * | 7/2002 | Phillips et al. | ................. | 709/220 |
| 2002/0138617 A1 * | 9/2002 | Christfort et al. | ............. | 709/225 |
| 2003/0009567 A1 | 1/2003 | Farouk | | |
| 2003/0171907 A1 * | 9/2003 | Gal-On et al. | ................... | 703/14 |

(Continued)

FOREIGN PATENT DOCUMENTS

| DE | WO 97/41654 | | 4/1997 |
|---|---|---|---|
| DE | WO 01/35622 | A1 | 11/2000 |
| DE | WO 02/102016 | A2 | 4/2002 |
| DE | WO 03/105444 | A1 | 6/2003 |

*Primary Examiner* — Matthew Sams
(74) *Attorney, Agent, or Firm* — Lawrence G. Fridman

(57) ABSTRACT

The invention relates to a switching system and a switching method for a mobile radio network. Data is switched and adapted to the technical specifications of a mobile station according to a profile. The adapted data is transmitted to the mobile station upon request through the mobile radio network.

20 Claims, 1 Drawing Sheet

(56) References Cited

U.S. PATENT DOCUMENTS

| | | | |
|---|---|---|---|
| 2004/0015911 A1* | 1/2004 | Hinsley et al. | 717/147 |
| 2004/0043763 A1* | 3/2004 | Minear et al. | 455/419 |
| 2004/0181550 A1 | 9/2004 | Warsta et al. | |
| 2004/0203854 A1 | 10/2004 | Nowak | |
| 2005/0015275 A1* | 1/2005 | Takekawa et al. | 705/1 |
| 2005/0021784 A1* | 1/2005 | Prehofer | 709/229 |
| 2005/0108690 A1* | 5/2005 | Lau et al. | 717/136 |
| 2008/0016182 A1* | 1/2008 | Sathish et al. | 709/219 |

* cited by examiner

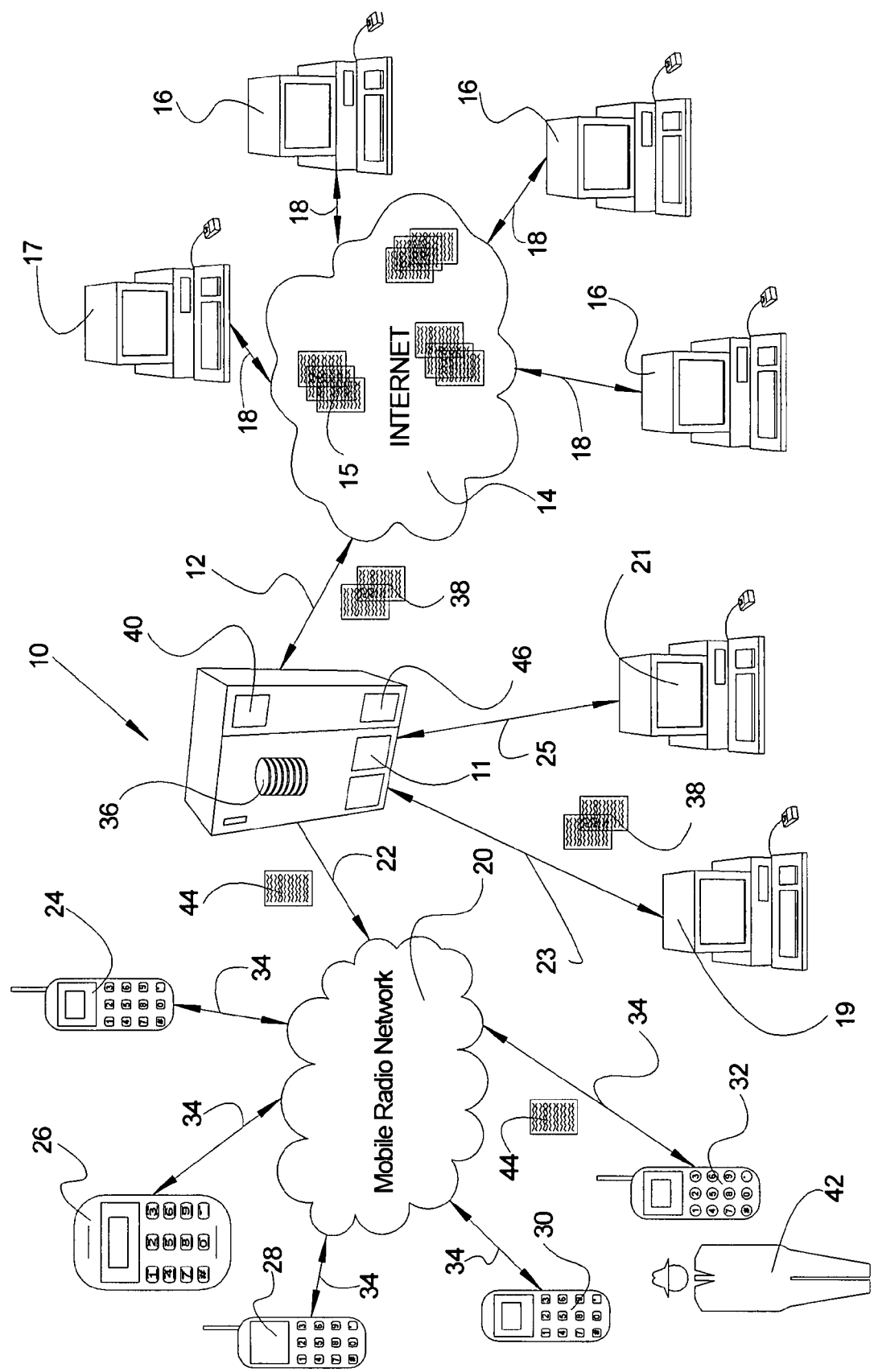

SYSTEM AND METHOD FOR DELIVERY OF DATA BETWEEN A DATA PROVIDER AND A MOBILE TELEPHONE NETWORK SUBSCRIBER

This is a continuing application of PCT Application PCT/EP2005/056696 filed Dec. 12, 2005 which claims priority of German Patent Application DE 10 2004 063 688.5 filed Dec. 28, 2004.

FIELD OF THE INVENTION

The invention relates to delivery and switching system for a mobile radio network and more particular to the system adopted for switching data between a data provider and a subscriber.

BACKGROUND OF THE INVENTION

Mobile stations are currently multifunctional devices, which are not only used for telephoning. Many programs, such as games or organizers can be used with mobile end stations and data can be processed. It has been found to be advantageous if the mobile stations are coupled to other devices for the data exchange.

It is known to exchange data between a data processing unit, also referred to as a computer, and a mobile station. The mobile station can be directly connected to the data processing unit by, for example cable-, infrared- or bluetooth-interfaces. A switching system is not necessary. The data are directly exchanged.

Furthermore a mobile station can be connected to the other devices through a mobile radio network. A data processing unit connected to the mobile radio network as well as to a further device takes up the switching function to the mobile station.

Data are often exchanged relating only to a program, user or to a mobile station. These data are transmitted for the data exchange each time. In order not to adapt programs to each specification of a mobile station specifications are often assumed. Therefore usually more data are transmitted than necessary.

SUMMARY OF THE INVENTION

Delivery and switching system for a mobile radio network of the invention comprises:
(a) a processor controlled data processing unit with a switching device in the form of a digital storage,
(b) a connection between the data processing unit of the switching system and a processor controlled data processing unit of the data provider,
(c) a connection between the data processing unit of the delivery and switching system and the mobile radio network, and
(d) a connection of the data processing unit to the switching system to the mobile station through the mobile radio network.

Furthermore, the invention relates to a delivery and switching method for a mobile radio network for switching data between a data provider and a subscriber comprising the steps of:
(a) establishing a connection between a data processing unit of the switching system and a data processing unit of the data provider,
(b) establishing a connection through the mobile radio network between the data processing unit of the switching system and a mobile station of the subscriber,
(c) transmitting data to the data processing unit of the switching system,
(d) intermediately storing the switching data in a storage of the data processing unit of the switching system,
(e) transmitting the data intermediately stored in the storage to the mobile station, and
(f) transmitting the data from the storage to the data processing unit of the data provider.

It is an object of the invention to eliminate the prior art drawbacks. It is a further object of the invention to develop a system and a method, respectively, enabling to determine the required information of the exchange partner during data exchange without having direct contact with the exchange partner.

According to the invention this object is achieved by providing a switching system for a mobile radio network adapted for switching data between a data provider and a subscriber in such a manner that means are provided for personalizing the switching data according to a profile provided in the data processing unit of the switching system.

Furthermore the object is achieved by a switching method for a mobile radio network for switching data between a data provider and a subscriber, wherein personalizing the switching data according to a profile is carried out, and the profile is stored in the data processing unit of the switching system.

Due to the switching system according to the present invention and the method according to the present invention it is not necessary anymore for the providers of data, especially programs to specifically prepare the data to enable access thereto for the user of the mobile station. The user of the mobile station makes use of the advantage that due to the profile present in the switching system not all data must be transmitted thereby reducing his mobile telephone costs. The data can be individually adapted by the data provider.

In an advantageous modification of the switching system according to the present invention the data are program date, especially game data adapted to be processed by a processor. The programs can be, for example Java-applications. Thereby the programs can be easily used on each platform, i.e. on mobile stations also.

Preferably the switching system comprises a data processing unit adapting the data for a certain processor system and/or operation system of a mobile station. As the mobile stations are often equipped with different operational systems and processors it is necessary to accordingly adapt the data, which is now carried out by the switching system according to the present invention.

It is not obvious that the data flows requested by the mobile station are forwarded through the mobile radio network. An advantageous modification of the switching system according to the present invention and the switching method is achieved if the data obtained from the internet are completely or partially transmitted through the mobile radio network to the mobile station.

A preferred modification of the switching system according to the present invention is obtained if the switching data are completely or partially stored in the storage of a central data processing unit. The data obtained from the internet are quasi intermediately stored in the storage of the central data processing unit where they may be adapted if necessary. This intermediate storing also serves to avoid discontinuation of the data flow to the mobile station if no connection to the provider can be established.

Furthermore an advantageous modification of the switching system according to the present invention and the switching method according to the present invention is obtained if only such data are adapted and transmitted to the mobile station, which are requested by the mobile station wherein the device type of the mobile station is transmitted with each request to the switching system. The switching system is preferably adapted to obtain more data than requested at a time. By this intermediate storage it can be achieved that the data are adapted and transmitted to the mobile station more quickly. However, only such data are transmitted which actually have been requested by the mobile station.

In an advantageous modification the switching system according to the present invention is provided with filter means filtering damaging sabotaging programs and/or sabotaging data, such as computer viruses, computer worms or trojans from the switching data in order to avoid attacks by computer viruses and the like. Thereby it is achieved that the data are protected of such sabotaging programs during the preparation before they reach the mobile stations.

As the operation of such a switching system incurs costs a preferred embodiment of the invention provides invoicing means to register the costs for the adapting and/or checking of the switching data obtained from the internet as well as switching them to the mobile station.

Corresponding to the switching system according to the present invention it has shown to be advantageous if with a switching method according to the present invention the data are program data, especially game data that can be processed by a processor. The programs can be, for example, Java-applications. Thereby the programs can be easily used on every platform, i.e. on mobile stations, also.

A further advantageous embodiment of the switching method according to the present invention is achieved in that the switching data obtained from the internet are fitted to a certain processor system and/or switching system of a mobile station.

In a preferred embodiment of the method according to the present invention the data are completely or partially provided in a storage of a central data processing unit. Thereby the adaption of the data can be centrally carried out, stored and administered.

In a further embodiment of the switching method according to the present invention only such data are adapted and transmitted to the mobile station which have been requested by the mobile end station, wherein with each request to the switching system the type of mobile end station is transmitted in the form of a digital code. This measure provides that only necessary data are transmitted and that the data connections are not burdened with unnecessary data flows. Furthermore the data can be selected according to the type of device.

A preferred embodiment of the switching method according to the present invention consists in that damaging sabotaging programs and/or sabotaging data, such as, for example, computer viruses, computer worms or trojans are filtered from the switching data. Thereby the mobile station is protected of such damaging programs before the programs reach the mobile station. Preferably only such data from the internet are transmitted to the mobile station through the mobile radio network, which have been checked by the data processing unit. This increases the user safety for subscribers.

In order to obtain the costs caused by such a method the costs for the adaption and/or checking of the data obtained from the internet and the transmission to the mobile station are registered and invoiced to the user of the mobile station in an advantageous embodiment of the method according to the present invention.

Further advantages result from the subject matter of the subclaims as well as the drawing with the accompanying description.

BRIEF DESCRIPTION OF THE DRAWING

Preferred embodiments of the invention will now be described, by way of example only, with reference to the accompanying diagrammatic figure in which:

FIG. 1 is a principle diagram of the delivery or switching system according to the present invention.

DETAILED DESCRIPTION OF THE INVENTION

In FIG. 1 numeral 10 denotes the switching system according to the present invention. The switching system 10 comprises a processor controlled by a base data processing unit 11, which is connected to the interne 13 by an internet interface 12. The internet 14 consists of a computer network wherein many computers 16, 17 are world wide interconnected. The internet 14 itself is symbolically represented by a cloud, as there can be any number of computers 16, 17 connected thereto. The computers 16 are also symbolically represented.

The computers 16, 17 are provided with a connection 18 to the internet 14, which is suitable for the internet. Bidirectional channels are provided for the internet 14 in order to be able to upload data 15 to the internet 14 as well as to download.

Computers 19, 21 are directly connected to the switching system 10, i.e. to the data processing unit 11. The computer 19 is connected to the data processing unit through a public telephone network 23 in the form of a landline. The computer 21, however, is provided with a direct, non-public line 25.

Furthermore, the data processing unit 11 is connected to a mobile radio network 20, arrow 22. The mobile radio network 20 is illustrated as a cloud and comprises everything that is necessary to operate such a radio network, such as, for example, according to the GSM- or UMTS-Standard. For illustrative purposes five different mobile stations 24, 26, 28, 30, 32 are shown which are adapted to participate in the operation of the mobile radio network 20. The mobile stations 24, 26, 28, 30, 32 are made by different manufacturers or are different types. The mobile end stations 24, 26, 28, 30, 32, therefore, operate with different processors and different software, especially different operation systems. The radio connection 34 between the mobile stations 24, 26, 28, 30, 32 and the mobile radio network 20 is bidirectional.

The data processing unit 11 of the switching system 10 comprises a storage 36. Data 38, reaching the data processing unit 11 from the internet are checked by a virus scanner 40. The virus scanner 40 also operates as a filter and only passes data 38 for switching, which do not comprise viruses or the like.

Internet games are offered by game providers, which have been developed specially for the internet 14. These games are then, for example, provided to the internet public by the computer 17. Each internet user can access the game with his computer 16 if he has access to the internet site of the game provider and play with his computer 16.

Using a simple example the switching system and the switching method shall be briefly described below. A user 42 who has become aware of a game in the internet 14 would now like to play it with his mobile station 32.

The user 42 now requests the game of the provider with his mobile end station 32 at the switching system 10. For example, the internet address of the internet site can be given, where the game is offered. During the data request to the switching system 10 the mobile station 32 automatically transmits the technical specification in the form of a digital code. The data processing unit 11 of the switching system 10 now accesses the computer of the provider of the games and stores the data 38 downloaded therefrom to the storage 36. Connections can be used through the internet 14, as well as through direct lines 23, 25 to the computers 17, 19 and 21 for the communication with the computers of the game providers. The game is checked by the virus scanner 40 if there are some sabotaging programs and/or sabotaging data comprised in the data 38 before the game is switched.

Using the technical specification the data processing unit 11 of the switching system 10 can now adapt the data belonging to the game requested by the mobile station 32 to its specification. The data processing unit 11 is provided with a profile of the mobile station 32, which is present in the storage 36. In such a way the game can be specially adapted to the mobile station 32. A further technical adaption process is, for example, to adapt the data downloaded from the internet 14 to the operating system and/or processor of the mobile station. Very often it is sufficient to adapt not all data 38 but only parts of the data 38. This applies, for example, if a programming code has been developed in Java. Interpreter of this programming language can be found on most of the mobile stations 24, 26, 28, 30, 32. The Java-data can be easily processed by such mobile stations 24, 26, 28, 30, 32 as long as special hardware is not addressed which is not implemented in the mobile station 32.

If the data are adapted to the mobile station by the switching system 10 the adapted data 44 are switched to the mobile station through the mobile radio network. The data 44 can be processed by the mobile station 32.

A charging unit 46 determines the amount of switched data 44 and determines the costs for the user 42 therefrom.

What is claimed is:

1. A switching system for a mobile radio network, said switching system being adapted for switching data between a data provider and a subscriber, the switching system comprising:
   (a) a switching device including a base data processing unit comprising a processor for controlling said base data processing unit and a digital storage,
   (b) an arrangement for establishing a first connection between said base data processing unit and a second data processing unit, a data provider having a processing unit, said base data processing unit receiving data from said data provider, wherein said base data processing unit of said switching device is connected to said data processing unit of said data provider through an internet,
   (c) an arrangement for establishing a second connection between said base data processing unit and a mobile radio network, at least one mobile station of the subscriber having an operation system and a processor, said mobile station being associated with said mobile radio network,
   (d) an arrangement for establishing a radio connection between said base data processing unit and said at least one mobile station through said mobile radio network,
   (e) an arrangement for personalizing said switching data according to a profile provided in said base data processing unit of said switching device,
   (f) said switching data is a program processable by a processor, said arrangement for personalizing said switching data adapts said program to the operating system or the processor of said at least one mobile station,
   (g) said at least one mobile station is configured for transmission of a technical specification thereof as digital code to said base data processing unit during requesting said switching data at said base data processing unit of the switching device from said data processing unit of the provider,
   (h) said base data processing unit is configured for accessing said processing unit of the data provider on a request from said mobile station and downloading said requested data from said data processing unit of the data provider through said interne connection, and
   (i) said base data processing unit is configured for selecting parts of said program for adaptation according to the type of said mobile station and for adapting said selected requested data according to said technical specifications of said mobile station.

2. A switching system according to claim 1, wherein said base data processing unit of said switching system is provided with an arrangement for attaching personalizing data.

3. A switching system according to claim 1, wherein said first and second connections or radio connection are bidirectional connections.

4. A switching system according to claim 1, wherein said first connection is a network connection, and said network connection is an internet.

5. A switching system according to claim 1, wherein said switching data is intermediately stored in said switching device.

6. A switching system according to claim 1, further comprising an arrangement for receiving and processing a request data made by said mobile station or by said data processing unit of said data provider and wherein only said request data is switched by said switching device.

7. A switching system according to claim 1, further comprising a filter arrangement for filtering damaging sabotaging programs or sabotaging data from said switching data, said at least one mobile station comprises a multiplicity of the mobile stations each having an operating system and a processor.

8. A switching system according to claim 1, wherein switching or checking of said switching data is related to costs and said switching system further comprising an arrangement for registering said costs for said switching or checking of said switching data.

9. A switching system according to claim 1, wherein the requested programs are adapted to the operating system and the processor of said at least one mobile station before said programs are transmitted to the mobile station, so that amount of transferred data is reduced and the programs are directly executed without further adaptation by the mobile station.

10. A switching method for a mobile radio network for switching data between a data provider and a subscriber comprising said steps of:
   (a) establishing a first connection through an internet between a base data processing unit having a processor for controlling operation of a switching system and a data processing unit of said data provider,
   (b) establishing a radio connection through said mobile radio network between said base data processing unit of said switching system and at least one mobile station of said subscriber,
   (c) transmitting data to said base data processing unit of said switching system,
   (d) intermediately storing said switching data in a storage of said base data processing unit of said switching system, (e) transmitting said data intermediately stored in said storage to said at least one mobile station,
(f) transmitting said data from said storage to said data processing unit of said data provider,
(g) personalizing said switching data according to a profile by a respective arrangement, said data is stored in said base data processing unit of said switching system,
(h) said switching data is a program processable by a processor, in said step of personalizing said switching data said arrangement for personalizing switching data adapts said program to the operating system or the processor of said at least one mobile station,
(i) transmitting a technical specification of said at least one mobile station as a digital executable code to said base data processing unit of the switching system during requesting said switching data at said base data processing unit from said data processing unit of the data provider and the base data processing unit by said at least one mobile station,
(j) accessing said processing unit of the data provider on a request from said mobile station by said base data processing unit of the switching device through said internet connection,
(k) downloading said requested processable program from said data processing unit of the data provider by said base data processing unit of the switching system, and
(l) selecting parts of said processable program for adaptation according to the type of said mobile station and adapting said selected program parts according to said technical specifications of said mobile station by said base data processing unit of said switching system; so that the downloading and adaptation of the program is performed by the base data processing unit of the switching system on demand of the requesting mobile station.

11. A switching method according to claim 10, wherein the personalizing data is associated with said switching data.

12. A switching method according to claim 10, wherein said switching data is transmitted in a direction of said at least one mobile station and in a direction of said data processing unit of said data provider; and said switching data is adapted to said profile.

13. A switching method according to claim 10, wherein said data processing unit of said data provider is connected to said data processing unit of said switching system through a network including an interne.

14. A switching method according to claim 10, wherein said switching involves a data requested by said base data processing unit of said switching system.

15. A switching method according to claim 10, wherein damaging sabotaging programs and sabotaging data are filtered from said switching data, and to accelerate said adaptation of the processable program only parts of the program required for adaptation by the predetermined mobile station are selected for adaptation by the base data processing unit of the switching device.

16. A switching method according to claim 10, wherein said switching involves a data checked by said base data processing unit of said switching system.

17. A switching method according to claim 10, wherein costs for said switching or checking of said switching data by said base data processing unit of switching system is registered and invoiced.

18. A switching method according to claim 10, wherein said data processing unit of said data provider is connected to said base data processing unit of said switching system through an internet.

19. A switching method according to claim 10, wherein neither the mobile station nor the data processing unit perform partial and complete adaptation of an executable code, and users and providers are able to disregard the adapted code executable by the respective mobile station.

20. A switching method for a mobile radio network for switching data between a data provider and a subscriber comprising said steps of:
(a) establishing a first connection through an internet between a base data processing unit having a processor for controlling operation of a switching system and a data processing unit of said data provider,
(b) establishing a radio connection through said mobile radio network between said base data processing unit of said switching system and at least one mobile station of said subscriber,
(c) transmitting data to said base data processing unit of said switching system,
(d) intermediately storing said switching data in a storage of said base data processing unit of said switching system,
(e) transmitting said data intermediately stored in said storage to said at least one mobile station,
(f) transmitting said data from said storage to said data processing unit of said data provider,
(g) personalizing said switching data according to a profile by a respective arrangement, said data is stored in said base data processing unit of said switching system,
(h) said switching data is a program processable by a processor, in said step of personalizing said switching data said arrangement for personalizing switching data adapts said program to the operating system or the processor of said at least one mobile station,
(i) transmitting a technical specification of said at least one mobile station as a digital executable code to said base data processing unit of the switching system during requesting said switching data at said base data processing unit from said data processing unit of the data provider and the base data processing unit by said at least one mobile station,
(j) accessing said processing unit of the data provider on a request from said mobile station by said base data processing unit of the switching device through said internet connection,
(k) downloading said requested processable program from said data processing unit of the data provider by said base data processing unit of the switching system, and
(l) selecting parts of said processable program for adaptation according to the type of said mobile station and adapting said selected program parts according to said technical specifications of said mobile station by said base data processing unit of said switching system;
whereby damaging sabotaging programs and sabotaging data are filtered from said switching data, and to accelerate said adaptation of the processable program only parts of the program required for adaptation by the predetermined mobile station are selected for adaptation by the base data processing unit of the switching device.

* * * * *